T. E. MURRAY, Jr., AND J. B. MURRAY.
METHOD OF ELECTRICAL WELDING.
APPLICATION FILED MAY 21, 1919.

1,316,385. Patented Sept. 16, 1919.

Inventors
Thomas E. Murray Jr
Joseph B. Murray
By their Attorney

UNITED STATES PATENT OFFICE.

THOMAS E. MURRAY, JR., AND JOSEPH B. MURRAY, OF BROOKLYN, NEW YORK.

METHOD OF ELECTRICAL WELDING.

1,316,385.      Specification of Letters Patent.     Patented Sept. 16, 1919.

Application filed May 21, 1919. Serial No. 298,748.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Electrical Welding, of which the following is a specification.

The invention is a method of uniting a metal inner tube and a metal outer inclosing tube by a single electrical welding operation.

In the accompanying drawings—

Figure 1:
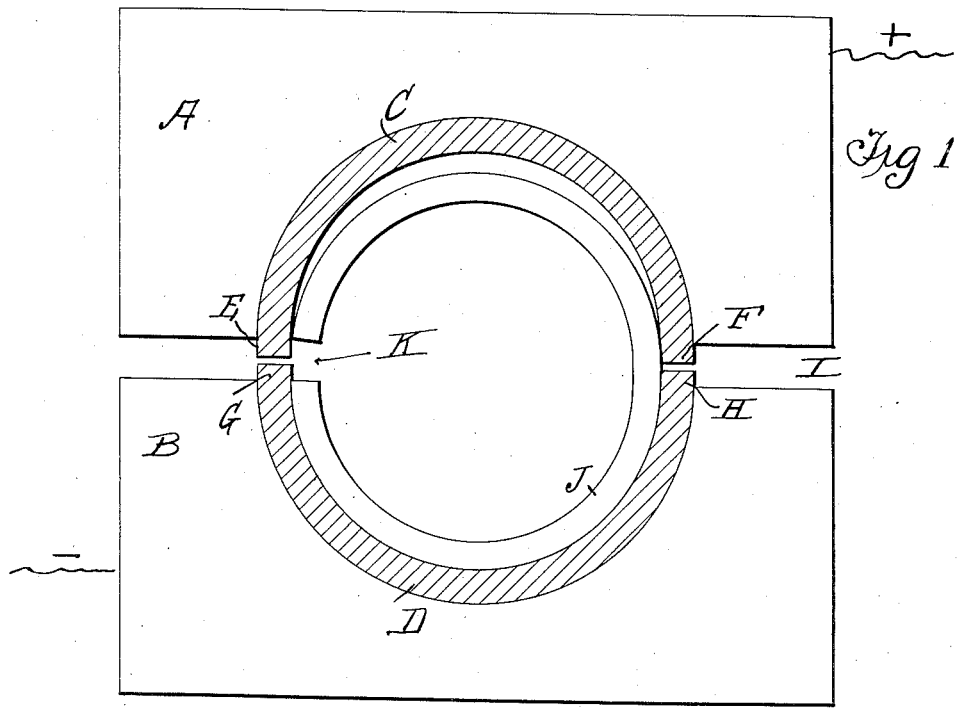
Figure 2:
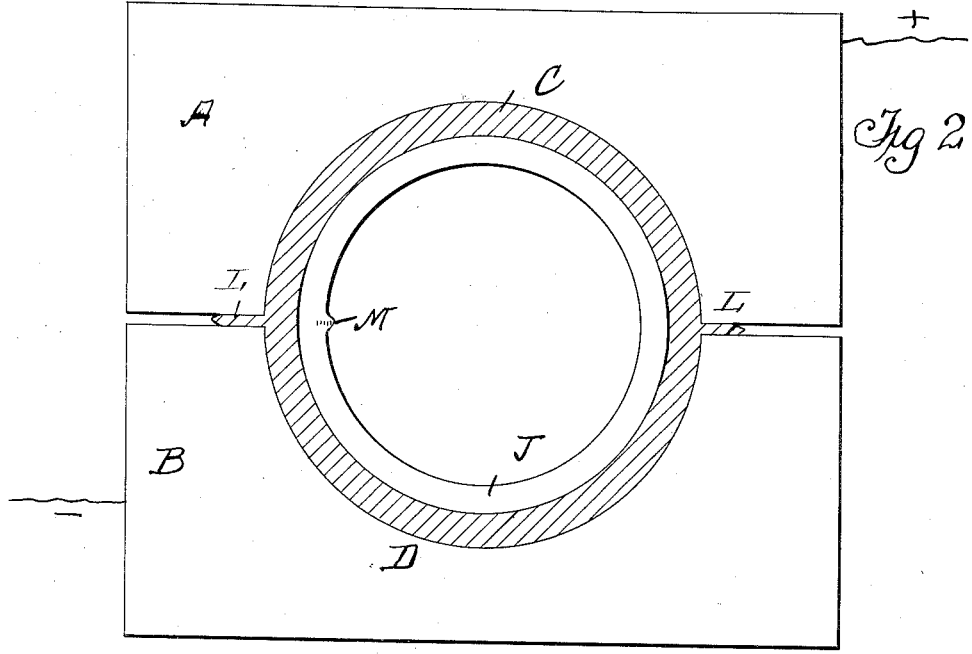

Figure 1 is an end view of the welding electrodes, the bent plate which finally forms the inner tube, and the outer inclosing tube, the said outer tube being shown in cross section, and the parts being represented in position before welding. Fig. 2 is a similar view, showing the parts after welding, the inner tube then being completed.

Similar letters of reference indicate like parts.

A and B are the welding electrodes, movable with respect to one another by any suitable means, not shown, whereby pressure is exerted upon the joint during the welding operation. The outer inclosing tube is formed in two longitudinal half sections C, D, preferably produced by striking up the metal, which are respectively seated in correspondingly formed longitudinal recesses in said electrodes. Integrally formed with the sections C, D are take-ups E, F on section C, and G, H on section D. When the sections C, D are seated in the recesses of electrodes A, B and before the welding operation is begun, said take-ups extend into the space I between said electrodes and register, as shown in Fig. 1.

J is a metal plate bent in cylindrical form, with its edges separated by a gap K. Said bent plate is placed in the section D, the electrode A being sufficiently elevated to permit of its introduction.

The electrode A is then forced downward, bringing the edges of the take-ups into contact, and the welding current is established, whereby the take-ups become fused as they are pressed together. As the take-ups disappear the edges of plate J are forced together, until finally the gap K is closed. If it be desired to weld the edges of plate J, the gap K should be disposed opposite to the take-ups E and G, as shown in Fig. 1. Part of the fused metal of the take-ups will then enter the gap K, and part will be extruded to form fins, as shown at L, which subsequently may be cut off. As the gap closes, part of the current passes from edge to edge thereof, and so keeps the take-up metal which entered the gap in a highly heated state, while also softening said edges, thus insuring the joint in the finished tube being produced coincidently with the welding together of the sections of the outer tube, and hence by a single welding operation. The fused metal of the take-ups which enters gap K bridges the joint between the opposing surfaces of the inner and outer tubes like a rivet and unites said tubes firmly together, and also becomes forced into said joint, and so unites said tubes over a still larger surface area. Any protrusion of the melted metal into the interior of the inner tube, as indicated at M, may afterward be cut off; or if the inner tube is not to receive some other member—as would be the case if the inner tube were, for example, a bushing—the protrusion may be left as it is.

We claim:

1. The method of completing a metal inner tube and uniting the same to a metal outer tube inclosing said inner tube, which consists in placing a metal plate bent in tubular form with a gap between its opposing edges within two longitudinal half sections of said outer tube, the gap in said plate being disposed opposite the joint between said sections, then establishing the welding current through said sections and pressing the same together until the edges of said sections and the edges of said gap are welded.

2. The method of closing a metal inner tube and uniting the same to a metal outer tube, which consists in placing a metal plate bent in tubular form with a gap between its opposing edges within two longitudinal half sections of said outer tube, then establishing the welding current through said sections and pressing the same together until said sections are welded and said gap is closed.

In testimony whereof we have affixed our signatures in presence of two witnesses.

THOMAS E. MURRAY, JR.
JOSEPH B. MURRAY.

Witnesses:
GERTRUDE T. PORTER,
MAY T. McGARRY.